(12) United States Patent
Chen et al.

(10) Patent No.: US 6,865,586 B2
(45) Date of Patent: *Mar. 8, 2005

(54) CALCULATOR CAPABLE OF RECOVERING CLEARED VALUES

(75) Inventors: Frank Chen, Taipei Hsien (TW); Anny Liu, Taipei Hsien (TW)

(73) Assignee: Kinpo Electronics, Inc., Taipei (TW)

( * ) Notice: Subject to any disclaimer, the term of this patent is extended or adjusted under 35 U.S.C. 154(b) by 592 days.

This patent is subject to a terminal disclaimer.

(21) Appl. No.: 10/067,258

(22) Filed: Feb. 7, 2002

(65) Prior Publication Data

US 2003/0149710 A1 Aug. 7, 2003

(51) Int. Cl.[7] ............................................... G06F 3/00
(52) U.S. Cl. ........................................ 708/131; 708/145
(58) Field of Search ................................ 708/130, 131, 708/142, 145

(56) References Cited

U.S. PATENT DOCUMENTS

| | | | | |
|---|---|---|---|---|
| 4,161,031 A | * | 7/1979 | Olander et al. | 708/525 |
| 4,298,949 A | * | 11/1981 | Poland | 708/130 |
| 5,772,635 A | * | 6/1998 | Dastur et al. | 604/131 |
| 5,914,676 A | * | 6/1999 | Akpa | 341/23 |

* cited by examiner

*Primary Examiner*—Chuong Dinh Ngo
(74) *Attorney, Agent, or Firm*—Bacon & Thomas PLLC

(57) ABSTRACT

A calculator comprises an input having an UNDO key for recovering cleared values. When displayed data or recorded data of memory is cleared by pressing one of deletion keys, the cleared data is pushed into a stack register. A flag register is set when the displayed data or recorded data is cleared by a deletion key. When the UNDO key is pressed and the flag register indicates that the displayed data or recorded data was cleared by the deletion key, a data entry is popped from the stack register, so as to recover the cleared value.

12 Claims, 3 Drawing Sheets

CALCULATOR CAPABLE OF RECOVERING CLEARED VALUES

BACKGROUND OF THE INVENTION

1. Field of the Invention

The present invention relates to a calculator and, more particularly, to a calculator capable of recovering cleared values.

2. Description of Related Art

Calculators have been widely used in a variety of fields in our daily lives due to their powerful functions. For example, calculators are used in shopping, accounting, mathematics, engineering, and statistics for providing simple functions such as arithmetic calculations or complicated functions such as scientific operations. When using a calculator, it is possible that a user may enter erroneous data. When such an error is found, the user may press one of a plurality of keys provided by the calculator to correct the error. For example, the user may press a backspace (BACK) key to sequentially correct typing mistakes, a clear entry (CE) key to clear the current data entry, or a clear (C) key to clear the data entry. Furthermore, before the calculator generates the final result, a number of intermediate results may be created, which have to be recorded and/or cleared by pressing CE, C, memory clear (MC) or memory recall clear (MRC) key, so as to perform subsequent operations.

However, when a user operates a calculator and inadvertently presses BACK, CE, C, MC, or MRC key to clear useful data, the typical calculator can only clear or modify the last entered data, while being unable to recover the cleared value. As a result, the user has to perform the whole calculation again. This is quite time-consuming and inconvenient. Therefore, it is desirable for the above conventional calculator to be improved so as to mitigate and/or obviate the aforementioned problems.

SUMMARY OF THE INVENTION

The object of the present invention is to provide a calculator having a convenient arrangement for recovering cleared values.

To achieve the object, there is provided a calculator capable of recovering cleared values, which comprises: an input unit including deletion keys for clearing currently displayed data or recorded data of the calculator, and an UNDO key for recovering the cleared data; an output unit for displaying the status of the calculator and operating results; an input/output buffer coupled to the input unit and the output unit and providing a display buffer for temporarily storing input and output data; a memory for storing program codes and providing memory space required for operating; an algebra logic processor coupled to the input/output buffer and the memory for providing arithmetic and logical operations; a stack register coupled to the algebra logic processor for temporarily storing previously cleared data by one of the deletion keys, wherein whenever the displayed data or the recorded data is cleared by pressing one of the deletion keys, the cleared data is pushed into the stack register; and a flag register coupled to the algebra logic processor, and being set when the displayed data or recorded data is cleared by pressing one of deletion keys, whereby, when the UNDO key is pressed and if the flag register indicates that the displayed data or recorded data was cleared by one of the deletion keys previously, a data entry is popped from the stack register and the flag register is cleared.

Other objects, advantages, and novel features of the invention will become more apparent from the detailed description when taken in conjunction with the accompanying drawings.

DETAILED DESCRIPTION OF THE PREFERRED EMBODIMENT

Figure 1:
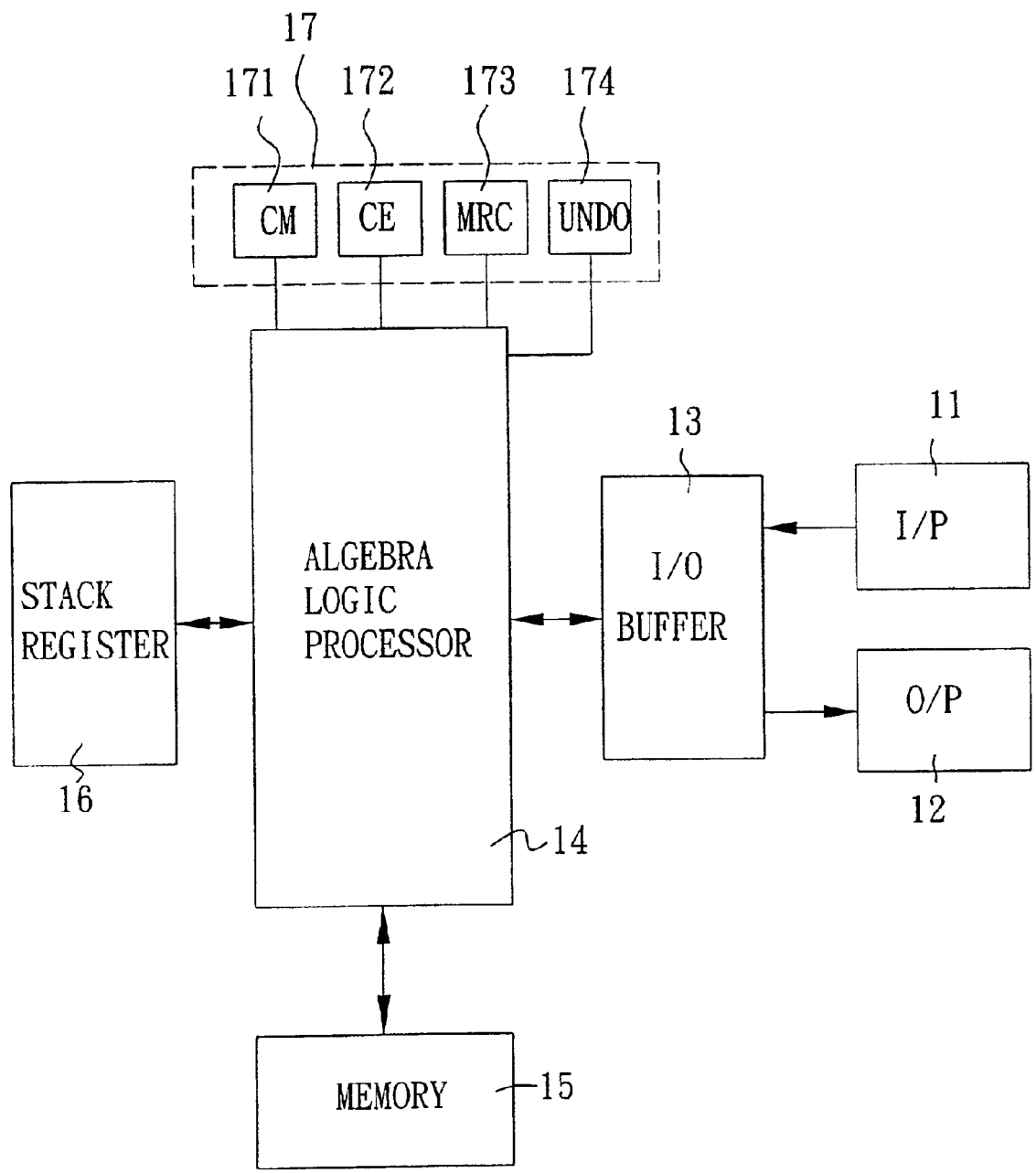
FIG. 1 is a block diagram of a preferred embodiment of the calculator capable of recovering cleared values according to the present invention.

With reference to FIG. 1, there is shown a calculator capable of recovering cleared values in accordance with the present invention. The calculator comprises an input (I/P) unit 11, an output (O/P) unit 12, an input/output (I/O) buffer 13, an algebra logic processor 14, a memory 15, a stack register 16, and a flag register 17, wherein the components 13 to 17 can be integrated in a processor on the calculator for providing the functions of logical operation and control.

The algebra logic processor 14 is responsible for providing arithmetic and logical operation capabilities. The memory 15 is responsible for providing program codes and memory space required for performing calculations.

The I/P unit 11 is implemented as a keypad including numerical keys, functional keys, deletion keys for clearing currently displayed data entry or recorded data entry, and an UNDO key for recovering the cleared value. The deletion keys comprise a backspace (BACK) key, a clear entry (CE) key, a clear (C) key, a memory clear (MC) key, and a memory recall clear (MRC) key.

The O/P unit 12 is preferably implemented as a liquid crystal display (LCD) for displaying calculator operation status and results. The I/O buffer 13 is responsible for providing memory space for temporarily storing I/O data. For example, the I/O buffer 13 provides a display buffer for temporarily storing I/O data displayed on the LCD.

The stack register 16 is responsible for temporarily storing data previously cleared by one of the deletion keys. That is, whenever displayed data entry or recorded data entry is cleared by pressing one of deletion keys, the cleared data is pushed into the stack register 16.

The flag register 17 comprises a CM flag 171, a CE flag 172, a MRC flag 173, and an UNDO recorder 174, which is set when displayed data or recorded data is cleared by pressing one of the deletion keys. Therefore, when the UNDO key is pressed and if the flag register 17 indicates that displayed data or recorded data was cleared by one of the deletion keys previously, a data entry is popped from the stack register 16 and the flag register 17 is cleared, thereby providing an undo function for recovering the cleared value.

Figure 2:
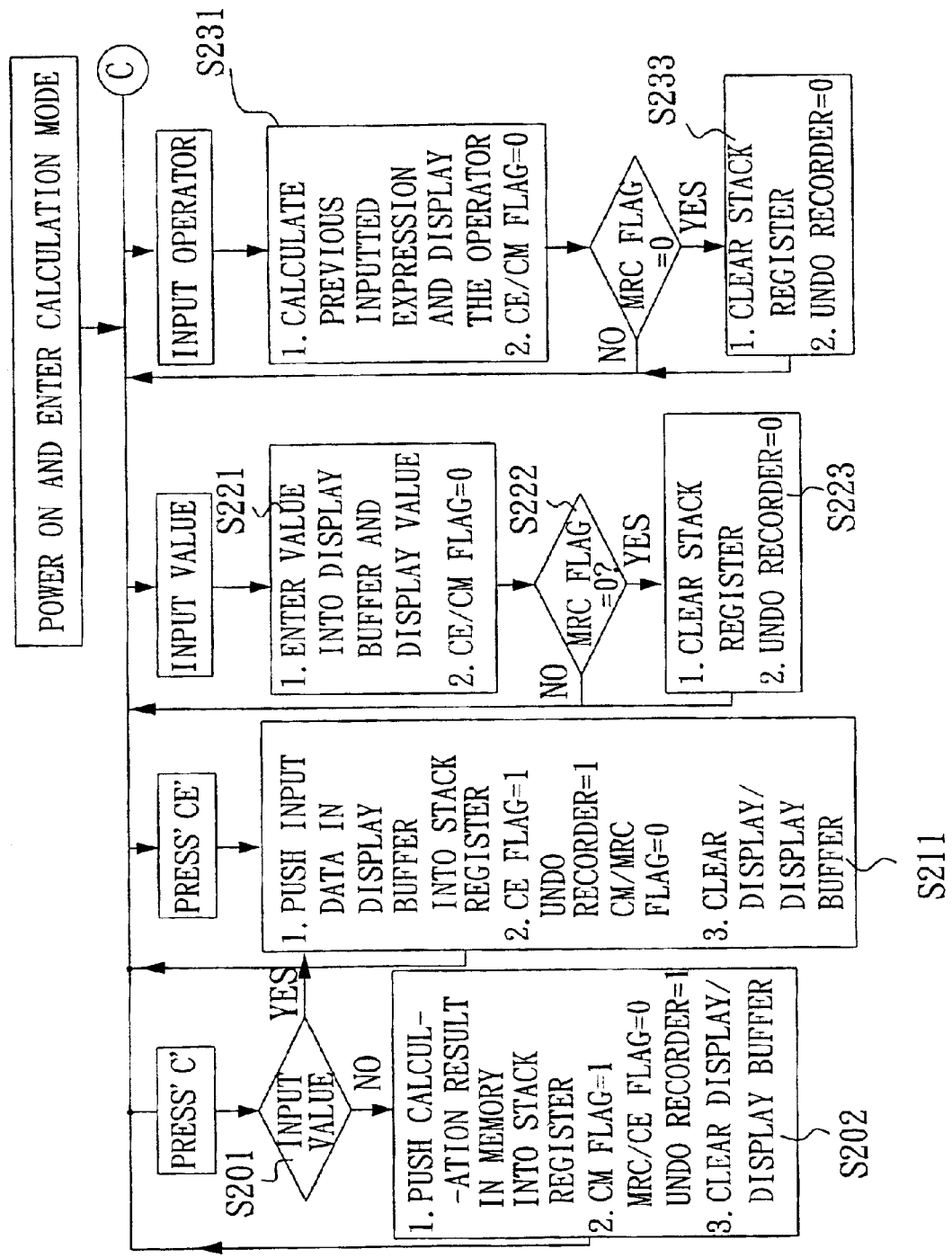
FIGS. 2A and 2B show a flow chart of the calculator capable of recovering cleared values according to the present invention.
Figure 2:
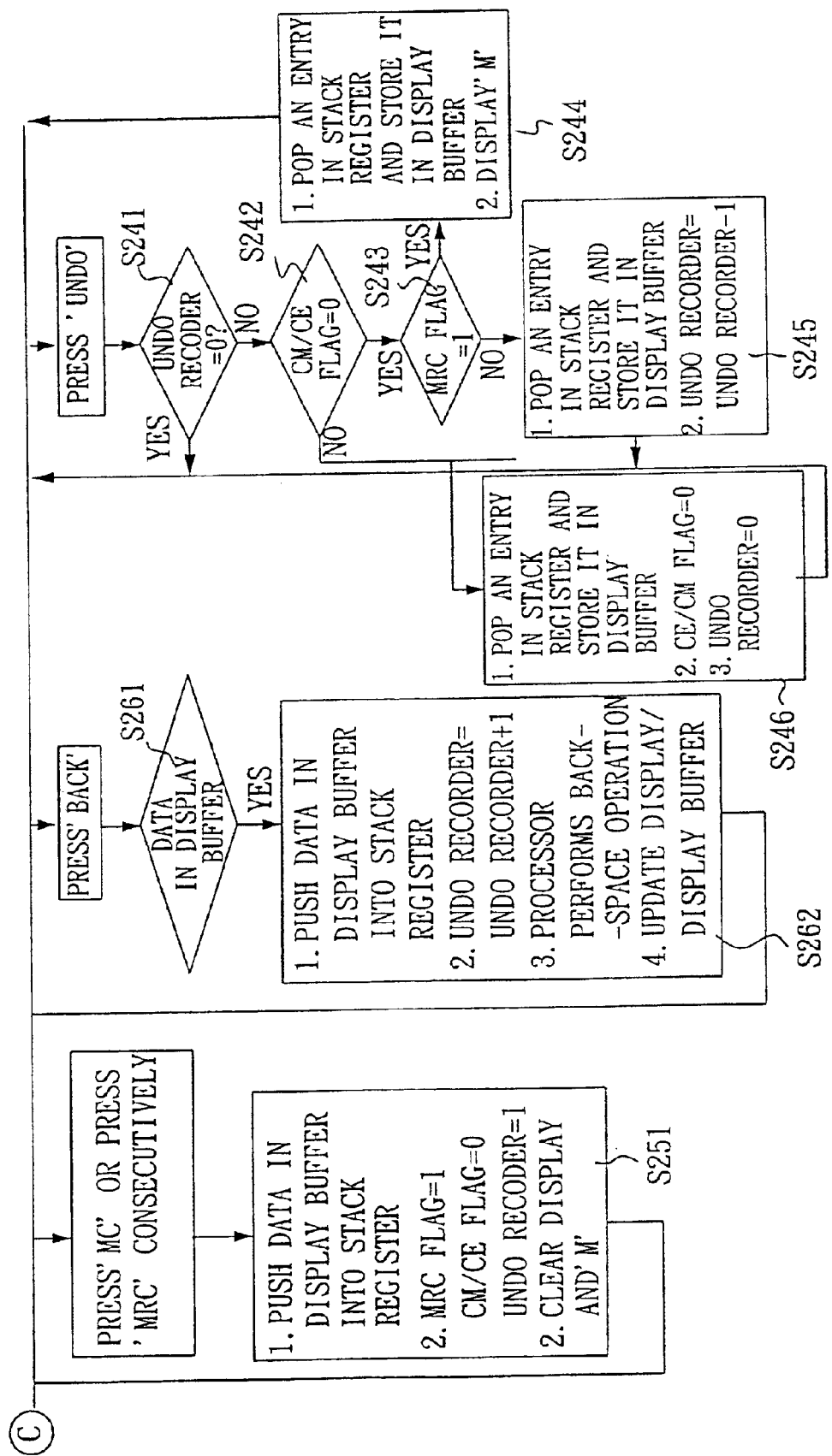

With reference to FIGS. 2A and 2B, a flow chart is shown on recovering cleared values by using the backspace key, the clear entry key, the clear key, the memory clear key, and the memory recall clear key in accordance with the present invention. When the clear (C) key is pressed, it is determined whether the calculator was previously in a data input mode or a result display mode (step S201). If the calculator was in a result display mode, the calculation result in the memory 15 is pushed into the stack register 16. Also, the CM flag 171 is set to 1, the CE flag 172 is cleared to 0, the MRC flag 173 is cleared to 0, and the UNDO recorder 174 is set to 1. Then, the display is cleared and related data in the display buffer is deleted (step S202).

When the CE key is pressed or step S201 determines that the calculator is in a data input mode, the input data stored in the display buffer is pushed into the stack register 16. Also, the CM flag 171 is cleared to 0, the CE flag 172 is set to 1, the MRC flag 173 is cleared to 0, and the UNDO recorder 174 is set to 1. Then, the display is cleared and related data in the display buffer is deleted (step S211).

When a value is inputted using the I/P unit 11, the value is entered into the display buffer for display. Also, the CM flag 171 is cleared to 0, and the CE flag 172 is cleared to 0 (step S221). At this moment, if the MRC flag 173 is 0 (step S222), indicating that no MC key or MRC key was used to clear data previously, the stack register 16 can be cleared and the UNDO recorder 174 is cleared to 0 (step S223).

When an operator is inputted using the I/P unit 11, the previously inputted expressions are calculated and the inputted operator is displayed. Also, the CM flag 171 is cleared to 0, and the CE flag 172 is cleared to 0 (step S231). At this moment, if the MRC flag 173 is 0 (step S232), indicating that no MC key or MRC key was used to clear data previously, the stack register 16 can be cleared and the UNDO recorder 174 is cleared to 0 (step S233).

When the MC key is pressed or the MRC key is pressed two consecutive times, data stored in the display buffer is pushed into the stack register 16. Also, the CM flag 171 is cleared to 0, the CE flag 172 is cleared to 0, the MRC flag 173 is set to 1, and the UNDO recorder 174 is set to 1. Then, the display and an icon "M" are cleared, and related data in the display buffer is cleared (step S251).

When the BACK key is pressed, it is first determined whether there is data in the display buffer (step S261). If yes, the data in the display buffer is pushed into the stack register 16, and the UNDO recorder 174 is incremented. Then, the algebra logic processor 14 performs the backspace operation. Finally, the content of the display and the display buffer is updated (step S262).

When the UNDO key is pressed and the UNDO recorder 174 is not 0 (step S241), indicating that displayed data or recorded data of the calculator has been cleared by pressing the BACK, CE, C, MC, or MRC key, it is determined whether CM flag 171 and CE flag 172 are 0 (step S242). If yes, it is determined whether the MRC flag 173 is 1 (step S243). If yes (MCR=1), it indicates that the MC key was pressed or the MRC key was pressed two consecutive times previously. Hence, the calculator is in a state as indicated by step S251. After the UNDO key is pressed, an entry in the stack register 16 is popped and stored in the memory 15, and an icon "M" is displayed (step S244). If not (MRC=0), it indicates that the BACK key was pressed previously and the calculator is in a state as indicated by step S261. After the UNDO key is pressed, an entry in the stack register 16 is popped and stored in the display buffer. Also, the UNDO recorder 174 is decremented (step S245). If the determination in step S242 is negative (at least one of CM and CE flags is not 0), it indicates that the C or CE key was pressed previously and the calculator is in a state as indicated by step S202 or S211. After the UNDO key is pressed, an entry in the stack register 16 is popped and stored in the display buffer. Also, the CM flag 171 is cleared to 0, the CE flag 172 is cleared to 0, and the UNDO counter 174 is cleared to 0 (step S246).

In view of the foregoing, with the provision of the UNDO key, the present invention can recover data or displayed results that have been cleared, thereby making the calculator more powerful and convenient to use.

Although the present invention has been explained in relation to its preferred embodiment, it is to be understood that many other possible modifications and variations can be made without departing from the spirit and scope of the invention as hereinafter claimed.

What is claimed is:

1. A calculator capable of recovering cleared values, comprising:

an input unit including deletion keys for clearing currently displayed data or recorded data of the calculator, and an UNDO key for recovering the cleared data;

an output unit for displaying status of the calculator and operating results;

an input/output buffer coupled to the input unit and the output unit and providing a display buffer for temporarily storing input and output data;

a memory for storing program codes and memory space required for operating;

an algebra logic processor coupled to the input/output buffer and the memory for providing arithmetic and logical operations;

a stack register coupled to the algebra logic processor for temporarily storing previously cleared data by one of the deletion keys, wherein whenever the displayed data or the recorded data is cleared by pressing one of the deletion keys, the cleared data is pushed into the stack register; and a flag register coupled to the algebra logic processor, and being set when the displayed data or recorded data is cleared by pressing one of the deletion keys, whereby, when the UNDO key is pressed and if the flag register indicates that the displayed data or recorded data was cleared by one of the deletion keys previously, a data entry is popped from the stack register and the flag register is cleared.

2. The calculator as claimed in claim 1, wherein the deletion keys comprise a backspace (BACK) key, a clear entry (CE) key, a clear (C) key, a memory clear (MC) key, and a memory recall clear (MRC) key; the flag register comprises a CM flag, a CE flag, a MRC flag, and an UNDO recorder.

3. The calculator as claimed in claim 2, wherein when the clear (C) key is pressed and the calculator is in a previous result display mode, a calculation result stored in the memory is pushed into the stack register; the CM flag is set to 1; the CE flag is cleared to 0; the MRC flag is cleared to 0; the UNDO recorder is set to 1.

4. The calculator as claimed in claim 2, wherein when the clear (C) key is pressed and the calculator is in a previous data input mode, input data temporarily stored in the display buffer is pushed into the stack register; the CM flag is cleared to 0; the CE flag is set to 1; the MRC flag is cleared to 0, and the UNDO recorder is set to 1.

5. The calculator as claimed in claim 2, wherein when the CE key is pressed, the input data stored in the display buffer is pushed into the stack register; the CM flag is cleared to 0; the CE flag is set to 1, the MRC flag is cleared to 0, and the UNDO recorder is set to 1.

6. The calculator as claimed in claim 2, wherein when a value is inputted by the input unit, the value is entered into the display buffer for display and the CM flag and the CE flag are cleared to 0, and if the MRC flag is 0, the stack register is cleared and the UNDO recorder is cleared to 0.

7. The calculator as claimed in claim 2, wherein when an operator is inputted by the input unit, an expression previously inputted is calculated and the input operator is displayed and the CM flag and CE flag are cleared to 0, and if the MRC flag is 0, the stack register is cleared and the UNDO recorder is cleared to 0.

8. The calculator as claimed in claim 2, wherein when the MC key is pressed or the MRC key is pressed for two consecutive times, data stored in the display buffer is pushed into the stack register; the CM flag is cleared to 0; the CE flag is cleared to 0; the MRC flag is set to 1; the UNDO recorder is set to 1.

9. The calculator as claimed in claim 2, wherein when the BACK key is pressed and if there is data in the display buffer, the data is pushed into the stack register and the UNDO recorder is incremented.

10. The calculator as claimed in claim 2, wherein when the UNDO key is pressed, and if the UNDO recorder is not 0 and the CM flag, CE flag and MRC flag are 0, 0 and 1, respectively, an entry in the stack register is popped and stored in the display buffer.

11. The calculator as claimed in claim 2, wherein when the UNDO key is pressed, and if the UNDO counter is not 0 and the CM flag, CE flag and MRC flag are 0, 0 and 1, respectively, an entry in the stack register is popped and stored in the display buffer and the UNDO recorder is decremented.

12. The calculator as claimed in claim 2, wherein when the UNDO key is pressed, and if the UNDO recorder is not 0 and at least one of the CM and the CE flags is not 0, an entry in the stack register is popped and stored in the display buffer, and the CM flag, CE flag, and UNDO recorder are cleared to 0.

* * * * *